US006715080B1

United States Patent
Starkovich et al.

(10) Patent No.: US 6,715,080 B1
(45) Date of Patent: Mar. 30, 2004

(54) MAKING CGI VARIABLES AND COOKIE INFORMATION AVAILABLE TO AN OLTP SYSTEM

(75) Inventors: Daniel P. Starkovich, Brooklyn Park, MN (US); Scott L. Rappa, White Bear Lake, MN (US); Joey L. Erickson, New Brighton, MN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/164,822

(22) Filed: Oct. 1, 1998

(51) Int. Cl.⁷ .............................. H04L 9/00; G06F 15/16
(52) U.S. Cl. .................... 713/201; 709/223; 709/228; 709/246; 370/466
(58) Field of Search ................ 713/200, 201, 713/202; 705/26; 707/9, 10; 709/223, 225, 226, 227, 228, 229, 246, 217, 249; 370/465–467

(56) References Cited

U.S. PATENT DOCUMENTS

| | | | | |
|---|---|---|---|---|
| 5,586,312 A | * | 12/1996 | Johnson et al. | 395/610 |
| 5,724,424 A | | 3/1998 | Gifford | 380/24 |
| 5,754,772 A | * | 5/1998 | Leaf | 709/203 |
| 5,917,485 A | * | 6/1999 | Spellman et al. | 345/336 |
| 5,931,917 A | * | 8/1999 | Nguyen et al. | 709/250 |
| 5,978,840 A | * | 11/1999 | Nguyen et al. | 709/217 |
| 6,058,378 A | * | 5/2000 | Clark et al. | 705/37 |
| 6,092,196 A | * | 7/2000 | Reiche | 713/200 |
| 6,115,744 A | * | 9/2000 | Robins et al. | 709/227 |
| 6,169,992 B1 | * | 1/2001 | Beall et al. | 707/103 |
| 6,185,567 B1 | * | 2/2001 | Ratnaraj et al. | 707/10 |
| 6,205,480 B1 | * | 3/2001 | Broadhurst et al. | 709/225 |
| 6,205,482 B1 | * | 3/2001 | Navarre et al. | 709/227 |
| 6,225,995 B1 | * | 5/2001 | Jacobs et al. | 345/335 |
| 6,226,752 B1 | * | 5/2001 | Gupta et al. | 713/201 |
| 6,304,915 B1 | * | 10/2001 | Nguyen et al. | 709/250 |
| 6,324,539 B1 | * | 11/2001 | Gebauer | 707/10 |
| 6,397,220 B1 | * | 5/2002 | Deisinger et al. | 707/102 |
| 6,411,995 B1 | * | 6/2002 | Gebauer | 709/219 |
| 6,415,288 B1 | * | 7/2002 | Gebauer | 707/10 |
| 6,442,611 B1 | * | 8/2002 | Navarre et al. | 709/227 |
| 6,446,117 B1 | * | 9/2002 | Gebauer | 709/217 |
| 6,496,821 B1 | * | 12/2002 | Gebauer et al. | 707/9 |
| 6,643,679 B1 | * | 11/2003 | Erickson et al. | 718/101 |
| 2001/0042108 A1 | * | 11/2001 | Gebauer | 709/219 |
| 2002/0046283 A1 | * | 4/2002 | Gebauer | 709/228 |

OTHER PUBLICATIONS

Bruce et al, "Security in Distrubuted Computing" 1997, Prentice Hall PTR, p. 295–313.*

"Configuring the Gateway" 1997, library.n0i.net/netscape/directory/ne–sig3/gateway.htm, p. 1–14.*

"Guide to Network Resource Tools: Providing Information", Sep. 1997, www.oci.unizh.ch/mirror/terena/gnrt/providing/interactive.html, p. 1–2.*

(List continued on next page.)

Primary Examiner—Ayaz Sheikh
Assistant Examiner—Christopher Revak
(74) Attorney, Agent, or Firm—Charles A. Johnson; Mark T. Starr; Nawrocki, Rooney & Sivertson, P.A.

(57) ABSTRACT

A system and method which allows the interchange of Cookie information and standard Common Gateway Interface (CGI) variables between a user system and an On-Line Transaction Processing (OLTP) enterprise server. The present invention also discloses a specialized form of a transaction gateway, known as a security gateway, which runs on a Windows NT or UnixWare Web Server machine, and is built as a client application to interoperate with an enterprise-based OLTP security service. Finally, the present invention discloses an enterprise-based OLTP security service, which is used in conjunction with the security gateway described above, which processes user generated authentication requests, and if successful, calls an end service requested by a user.

35 Claims, 8 Drawing Sheets

OTHER PUBLICATIONS

Kelley, "The Computists' Communique" Mar. 31, 1993, www.computists.com/tcc/tcc3n13.html, p. 1–11.*

"Technical Details: Web Pages and Transaction on the 2200 Node" Jun. 4, 1998, owlweb1.creighton.edu/pages/adminhelp/tech1.htm, p. 1–9.*

Shklar, "Web Access to Legacy Data" May 1996, athos.rutgers.edu/~shklar/web–legacy/ww5_tutorial.html, p. 1–14.*

Peng et al, "Access Legacy Data through the World–Wide–Web" Feb. 26, 1997, gram.eng.uci.edu/students/cpeng/ibmj/ibmj.html, p. 1–11.*

Leach et al, "Microsoft makes mainframe moves; developing browser–based hooks into legacy systems" Mar. 17, 1997, PC Week, V14, N 11, dialog text search, p. 8.*

Matthews, "Remote access to enterprise transaction processing via the Web" Feb. 1997, Enterprise System Journal, V12, N2, dialog text search, p. 8–12.*

"Technical Details: Web pages and transactions on the 2200 node" Jun. 1, 1998, http://wlweb1.creighton.edu/pages/adminhelp/tech1.htm.*

Hood, "Speeding down the information super highway with LINC" http://www.coe.unisys.com/demos/lincpapr/ww4.htm.*

Jon G. Auerbach, "Open Market Inc. Says It Will Receive Patents for Internet–Commerce Software," *Wall Street Journal*, Mar. 3, 1998, p. 36.

* cited by examiner

MAKING CGI VARIABLES AND COOKIE INFORMATION AVAILABLE TO AN OLTP SYSTEM

CROSS REFERENCE TO CO-PENDING APPLICATIONS

The present application is related to U.S. patent application Ser. No. 09/164,759, filed Oct. 1, 1998, entitled "A COMMON GATEWAY WHICH ALLOWS APPLETS TO MAKE PROGRAM CALLS TO OLTP APPLICATIONS EXECUTING ON AN ENTERPRISE SERVER", and application Ser. No. 09/164,932, filed Oct. 1, 1998, entitled "A MULTI-CLIENT USER CUSTOMIZED DCOM GATEWAY FOR AN OLTP ENTERPRISE SERVER APPLICATION", both of which are assigned to the assignee of the present invention and incorporated herein by reference.

BACKGROUND OF THE INVENTION

1. Field of the Invention

The present invention relates to a security system for validating Web-Based requests, and more specifically, to a security system whereby CGI Variables and Cookie information from a Web-Based client are passed via a security gateway to an enterprise based OLTP security service for validation.

2. Description of the Prior Art

The methods by which companies conduct business with their customers are undergoing fundamental changes, due in large part to World Wide Web technology. In addition, the same technology that makes a company accessible to the world, may be used on internal company networks for conducting operational and administrative tasks.

One of the technologies underlying the World Wide Web is the web browser. Web browsers have become a de facto user interface standard because of their ability to interpret and display information having standard formats (e.g., HyperText Markup Language (HTML), standard test, GIF, etc.). Client software programs, popularly referred to as web-browsers (e.g., Mosaic, Netscape Navigator, Microsoft Internet Explorer, etc.), execute on client systems and issue requests to server systems. The server systems typically execute HyperText Transport Protocol (HTTP) server programs which process requests from the web browsers and deliver data to them. The system that executes an HTTP server program and returns data to the web browser will hereinafter be referred to as a Web Server System. An HTTP server program itself will be referred to as a web server.

A Web Server System has access to on-line documents that contain data written in HyperText Markup Language (HTML). The HTML documents contain display parameters, capable of interpretation by a web browser, and references to other HTML documents and web servers (source: World Wide Web: Beneath the Surf, from UCL Press, by Mark Handley and Jon Crowcroft, on-line at http://www.cs.ucl.ac.uk/staff/jon/book/book.html).

As web browsers are making their mark as a "standard" user interface, many businesses have a wealth of information that is managed by prior art data base management systems such as DMS, RDMS, DB2, Oracle, Ingres, Sybase, Informix, and many others. In addition, many of the database management systems are available as resources in a larger transaction processing system. There are also mission critical applications which still reside on enterprise servers, since these type of systems have resiliency and recovery features historically not available on other smaller types of servers.

One key to the future success of a business may lie in its ability to capitalize on the growing prevalence of web browsers in combination with selectively providing access to the data that is stored in its databases. Common Gateway Interface (CGI) programs are used to provide web browser access to such databases.

The Common Gateway Interface (CGI) is a standard for interfacing external applications, such as web browsers, to obtain information from information servers, such as web servers. The CGI allows programs (CGI programs) to be referenced by a web browser and executed on the Web Server System. For example, to make a UNIX database accessible via the World Wide Web, a CGI program is executed on the Web Server System to: 1) transmit information to the database engine; 2) receive the results from the database engine; and 3) format the data in an HTML document which is returned to the web browser. CGI variables typically include information such as the IP address of the browser, or the port number of the server.

Often associated with CGI Variables, cookies are packets of information which may be sent back to a user system after the user accesses a web site. These packets of information indicate how a user utilized various functions associated with the site. This information will be stored on the user system along with the Uniform Resource Locator (URL) for the web site, and the information is passed back to the server if the user accesses the web site again.

Server software uses the user history provided by the cookies to make decisions regarding how the user request is to be handled. For example, assume the web site involves history. The cookie information will inform the server that the current request is from a user interested in the Civil War. This allows the server to provide the user with advertisements on books related to the Civil War.

There is a growing need for greater assurances that information being passed along the Internet is secure and will not be intercepted. Some of the problems involved with Internet hacking include stolen access, stolen resources, e-mail counterfeiting, vandalization, and Internet agents (worms) (source: Matteo Foschetti, *Internet Security*, California State University, Fullerton, April 1996, available on-line at: http://www.ecs.fullerton.edu/~foschett/security.html). Many consumers have the general perception that transacting business on the Internet is not safe, thus they are reluctant to participate in Internet activities such as on-line shopping, sending messages, submitting to newsgroups, or web surfing. Although some people's perception of Internet security breaches may be somewhat overblown, figures do prove the vulnerability of the Internet. It has been estimated that over 80% of all computer crimes take place using the Internet. With over 30,000 interconnected networks and 4.8 million attached computers including over 30 million users, there is a legitimate Internet security concern.

Businesses are faced with the challenge of adapting their present usage of yesterday's technology to new opportunities that are made available with the World Wide Web. Most business application software and underlying databases are not equipped to handle interaction with web browsers. It would therefore be desirable to have a secure, flexible and efficient means for allowing interoperability between enterprise-based business application software and the World Wide Web.

SUMMARY OF THE INVENTION

The present invention overcomes many of the disadvantages associated with the prior art by providing a system and method which allows the interchange of Cookie information and standard Common Gateway Interface (CGI) variables between a user system and an On-Line Transaction Processing (OLTP) enterprise server. Previously, the interchange of Cookies and CGI variable information was confined between a user system and a web-server.

In a preferred embodiment of the present invention, when a user accesses a selected web site from a web browser, packets of Cookies are passed from an On-Line Transaction Processing (OLTP) enterprise server to a user system. These packets of Cookies indicate how the user utilized various functions associated with the site. This information is stored on the user system along with the Uniform Resource Locator (URL) for the web site, and is passed back to the OLTP enterprise server if a user accesses the web site again.

CGI Variables are also used to pass information between a user system and an enterprise OLTP server. These CGI variables can include information such as the IP address of the web browser or the port number of the web server.

The present invention passes Cookies and CGI variables between a Personal Computer (PC) based web browser and an enterprise OLTP server via web server, WebTx server and transaction gateway interface components.

The present invention also discloses a specialized form of a transaction gateway, known as a WebTx security gateway. This security gateway runs on a Windows NT or UnixWare web server machine, and is built as a client application to interoperate with an enterprise-based OLTP security service. In an illustrative embodiment, the security gateway receives a OLTP transaction request and associated Cookie/CGI Variable information from the WebTx server, builds a view file using the Cookie and CGI Variables, calls the enterprise-based OLTP security service, then waits for validation of the OLTP transaction request. The security gateway will eventually receive a response from an OLTP security service indicating whether the request was validated by the OLTP server. If the request was validated, the security gateway will allow the request to be processed. That is, the security gateway builds a view buffer associated with the requested OLTP service, then passes the buffer to the requested OLTP service.

The present invention also discloses an enterprise-based OLTP security service, which is used in conjunction with the security gateway of the present invention. This security service processes user-id authentication requests, and if successful, calls an end service requested by a user.

The security service of the present invention offers several significant advantages over prior art security services. The present invention allows all request validation to be performed directly on the enterprise OLTP system. In the past, requests made to a gateway for access to an enterprise OLTP system were validated first on a workstation based gateway server. If the requests were found to be invalid, they were not passed on to the OLTP system. However, maintaining the updated validation information on a workstation as is necessary to validate such requests presents a large administrative burden. In addition, the security and resiliency aspects of an enterprise-based security service are superior to similar functionality available in a workstation based security service.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

The detailed descriptions which follow are presented largely in terms of algorithms and symbolic representations of operations on data bits within a computer memory. These algorithmic descriptions and representations are the means used by those skilled in the data processing arts to most effectively convey the substance of their work to others skilled in the art.

An algorithm is here, generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers or the like. It should be kept in mind, however, that all of these and similar terms are to be associated with the appropriate physical quantities and are merely convenient labels applied to these quantities.

Furthermore, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases, it should be kept in mind the distinction between the method operations in operating a computer and the method of computation itself. The present invention related to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms present herein are not inherently related to a particular computer system or other apparatus. In particular, various general purpose computer systems may be used with computer programs written in accordance with the teachings of the present invention, or it may prove more convenient to construct more specialized apparatus, to perform the required method steps. The required structure for such machines will be apparent from the description given below.

Figure 1:
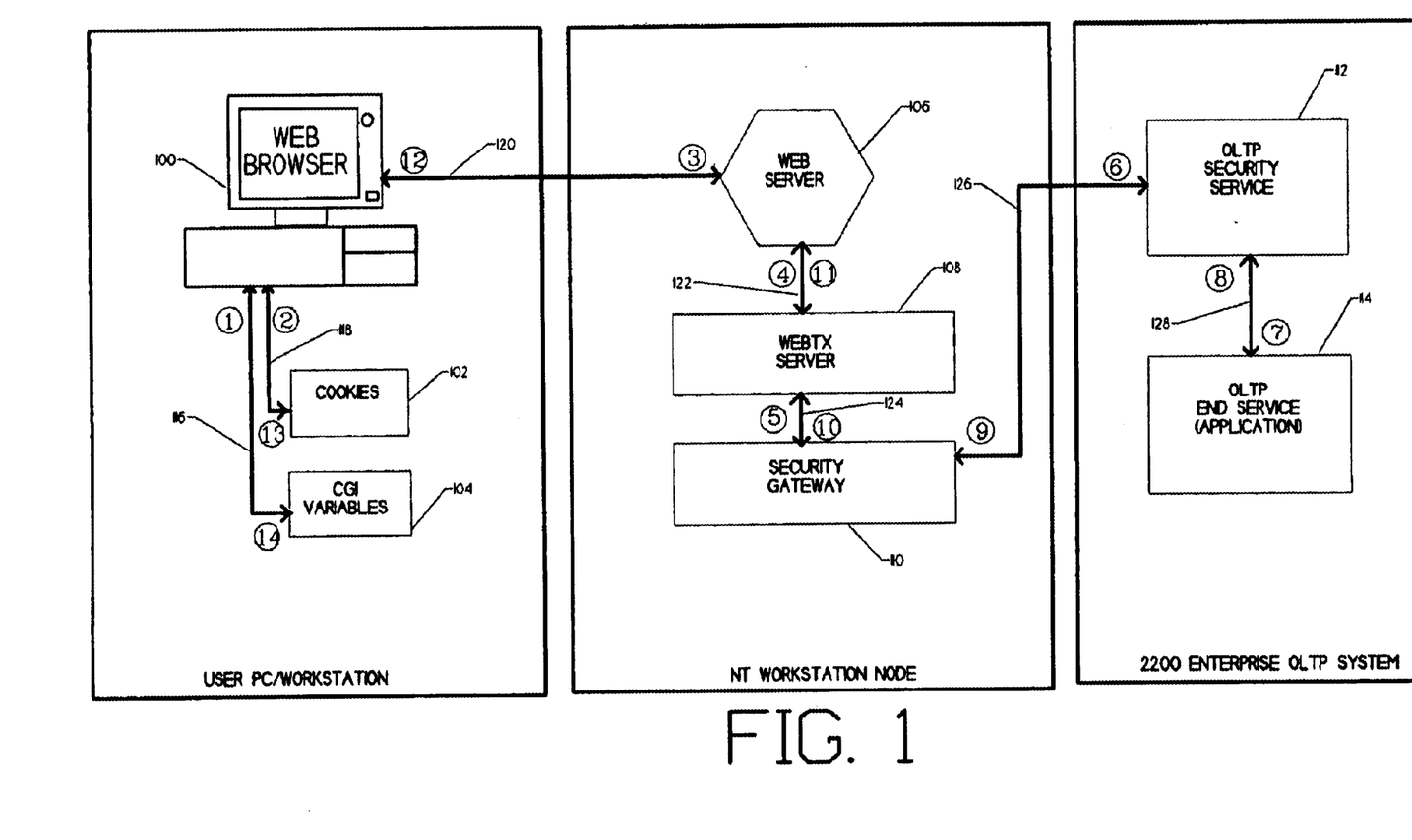
FIG. 1 is generalized block diagram of components utilized by the current invention, including a step-by-step illustration of a transaction as it proceeds through the components of the system.

FIG. 1 is a generalized block diagram of components utilized by the current invention, including a step-by-step illustration of a web transaction request as it proceeds through the components of the system.

Web browsers 100 are the primary tool for viewing the contents of information repositories on the World Wide Web. By further definition, a web browser 100 is a tool (software application) used to view the contents of an item packaged in a format requiring decoding, deciphering or decryption. Web browsers 100 read and display web pages. Web pages are merely text based characters arranged in a manner such that background and foreground colors, fonts (styles of characters), and images are transformed into the results of the intended web page. Thus, it is the job of the web browser 100 to interpret the HTML (arranged text characters) into the colors, fonts, and images that are presented to a user when accessing a web page. Examples of popular, commercial web browsers 100 include "Navigator" from Netscape Corporation, and "Internet Explorer" from Microsoft Corporation.

When a user accesses a web site, web browser 100 retrieves Cookie and CGI Information from an enterprise-based OLTP server. Cookies are packets of information which may be sent back to a user system after a user accesses a web site. These packets of information indicate how the user utilized various functions associated with the site. Cookie information is stored on the user system (in Cookie repository 102 and CGI repository 104), along with the Uniform Resource Locator (URL) for the web site, and is passed back to the enterprise OLTP server if the user accesses the web site (appropriate range of URLs) again. Software on the enterprise OLTP server uses the user history provided by the Cookies 102 to make decisions regarding how the user request is to be handled.

CGI Variables 104 are also used to pass information between a user system (web browser) 100 and an enterprise OLTP server. These CGI variables can include information such as the IP address of the web browser 100, or the port number of the web server 106.

A transaction is a complete unit of work that maintains the ACID properties (atomicity, consistency, isolation, and durability) for the work it performs. Typically a transaction updates one or more databases. In distributed transaction processing (DTP), a transaction can include multiple units of work performed on one or more systems.

As an illustrative example of a transaction, a user accesses a web site of a bookseller specializing in historical books through web browser 100. Already stored within the Cookie information repository 102 on the user system is a Cookie which indicates a shipping preference for UPS second day air, a user preference for books on the Civil War, and various other transactional information that has been previously entered by the user on a previous order. This Cookie information is passed from Cookie information repository 102 on the user system to an enterprise based OLTP end service application 114 as soon as the user re-enters the bookseller web site. The enterprise based OLTP service application 114 then reads the user Cookie information, and passes back advertisements on books related to the Civil War to the web browser 100. If the user decides to purchase a book, transaction related cookie information which has already been passed to the end service application minimizes the amount of information that needs to be re-entered by the user. Finally, system access to sensitive transactional information provided by the user during the ordering process (such as credit card numbers, personal identification numbers, etc.) is protected by a security component (security gateway 110, and OLTP security service 112) which validates the transaction before it is processed by the end service 114.

Figure 7:
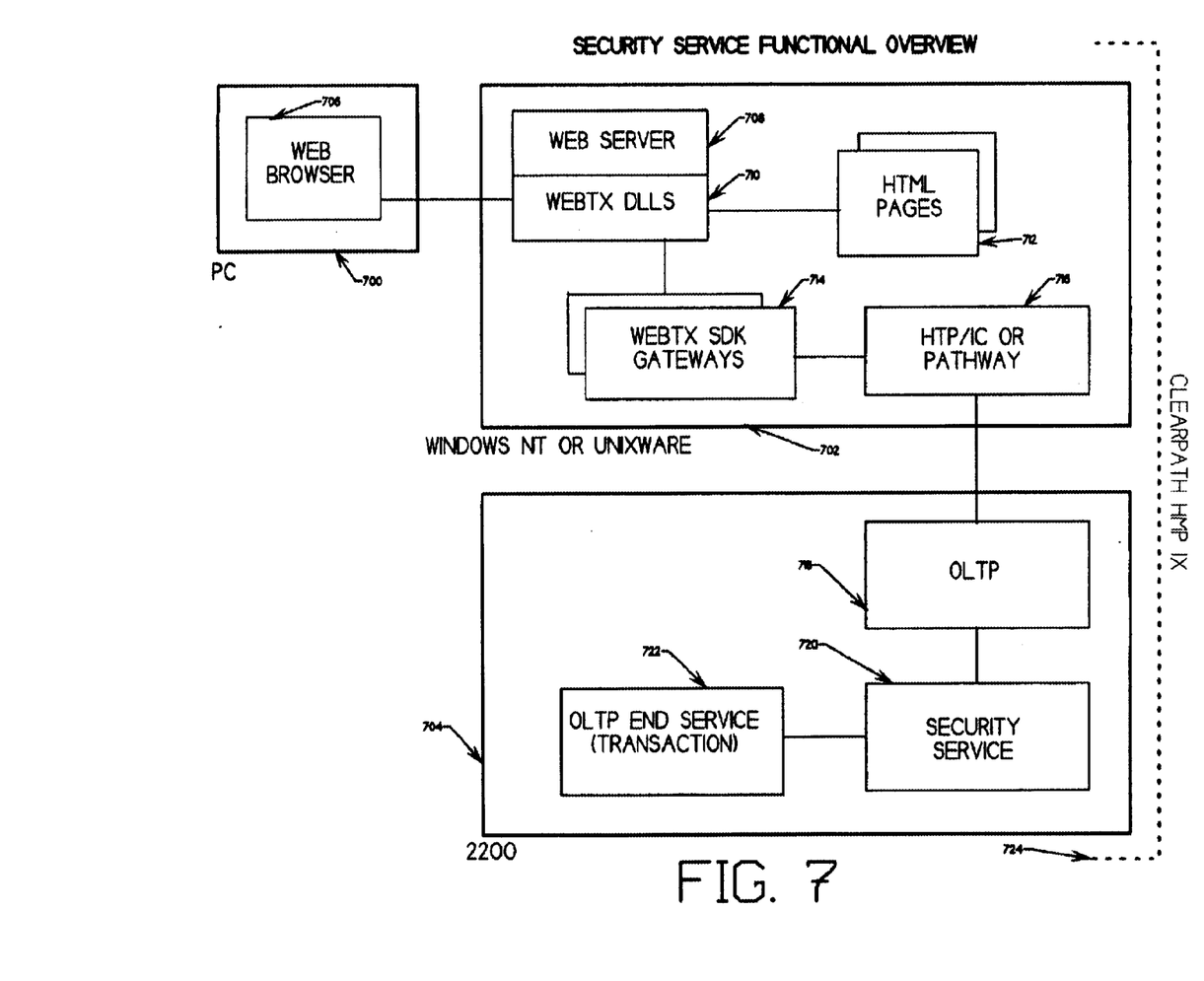
FIG. 7 illustrates a functional, block-level overview of the enterprise-based On-Line Transaction Processing (OLTP) System security service of the present invention.

By way of definition, a security service is a UCS C code module supplied by Unisys and written in the form of a standard Open/On-Line Transaction Manager OLTP-TM2200 service (further described in the detailed description of FIG. 7). It processes user-id authentication requests and, if successful, calls an end service for that user. An end service 114 is an OLTP-TM2200 service that needs to be executed by an Internet user. It can be a new generation service or a Heritage Application Access (HAA) service.

Information that can be passed to the enterprise-based OLTP security service application 112 from the web browser 100 via an authentication view buffer or a security service view buffer includes user identification information such as: passwords, account numbers, user-id, the OLTP end service name to call, and browser CGI variables. The Cookie and CGI information was passed to web server 106 via interface 120, as shown in step 3.

In step 4, after the Cookie and CGI information has been successfully passed to the web server 106, the web server 106 determines if the request is for the WebTx Server 108. If so, the web server 106 (Microsoft IIS or Netscape Enterprise/Fastrack) formats the CGI variables and Cookie information into one long string which is passed to the WebTx Server 108 via interface 122.

In step 5, the WebTx Server 108 understands the format of the long string passed by the web server 106, then re-packages the variables into an array which is passed to whichever Gateway is associated with the request (such as the security gateway shown at 111), via interface 124. The WebTx security gateway 111 is a specialized WebTx gateway that runs on a Windows NT or UnixWare web server machine. This gateway 111 is built as a client application to interoperate in conversation mode with the OLTP-TM2200 security service. This code module can be customized to meet environmental needs.

In step 6, the security gateway 111 builds a security service view file using the Cookie and CGI variables, then calls the On-Line Transaction Processing (OLTP) security service 112 executing on an OLTP server (such as a Unisys 2200). The security gateway 110 passes the view buffer to the OLTP Security Service 112 via interface 126, then waits for validation of the request. The security gateway 110 will eventually receive a response from the OLTP security service 112 indicating whether the response was validated by the OLTP security service 112. If the request was validated, the security gateway 110 will allow the request to continue to be processed. If the request was not validated by the security service 112, further access to the desired OLTP end service 114 is denied.

In step 7, after the request is validated by the security service 112, the security gateway 110 builds buffer subtype (view) associated with the requested OLTP end service 114, and passes the buffer subtype to the OLTP security service 112. A buffer subtype specifies exactly how the data in a buffer is structured. This structure is defined according to the needs of an application program (service) and the database information it uses. A properly formatted buffer subtype definition is called a view. The security service 112 will then call the end service (the requested OLTP service application) 114 via interface 128.

In step 8, after the end service 114 has completed its task, the end service results are returned in an output view file to the OLTP Security Service 112 via interface 128.

In step 9, the end service results are returned from the OLTP Security Service 112 to the Security Gateway 110 via interface 126. The results will be in a view file format.

In step 10, the security gateway 110 unpacks the end service results from the view file, builds a populated web page and Cookie from information in said view file, and returns the web page and Cookie information to the WebTx Server 108, via interface 124. This web page and Cookie information will ultimately be passed back to the web browser 100 via the web server 106.

In step 11, the WebTx Server 108 passes back the populated web page and Cookie information to the web server 106, via interface 122.

In step 12, the web server 106 passes back the Cookie information and populated web page to the web browser 100.

In steps 13 and 14, any updated Cookie/CGI Variable information passed back from the web server is stored in the Cookie 102 and CGI Variable 104 repositories on the user system.

Figure 2:
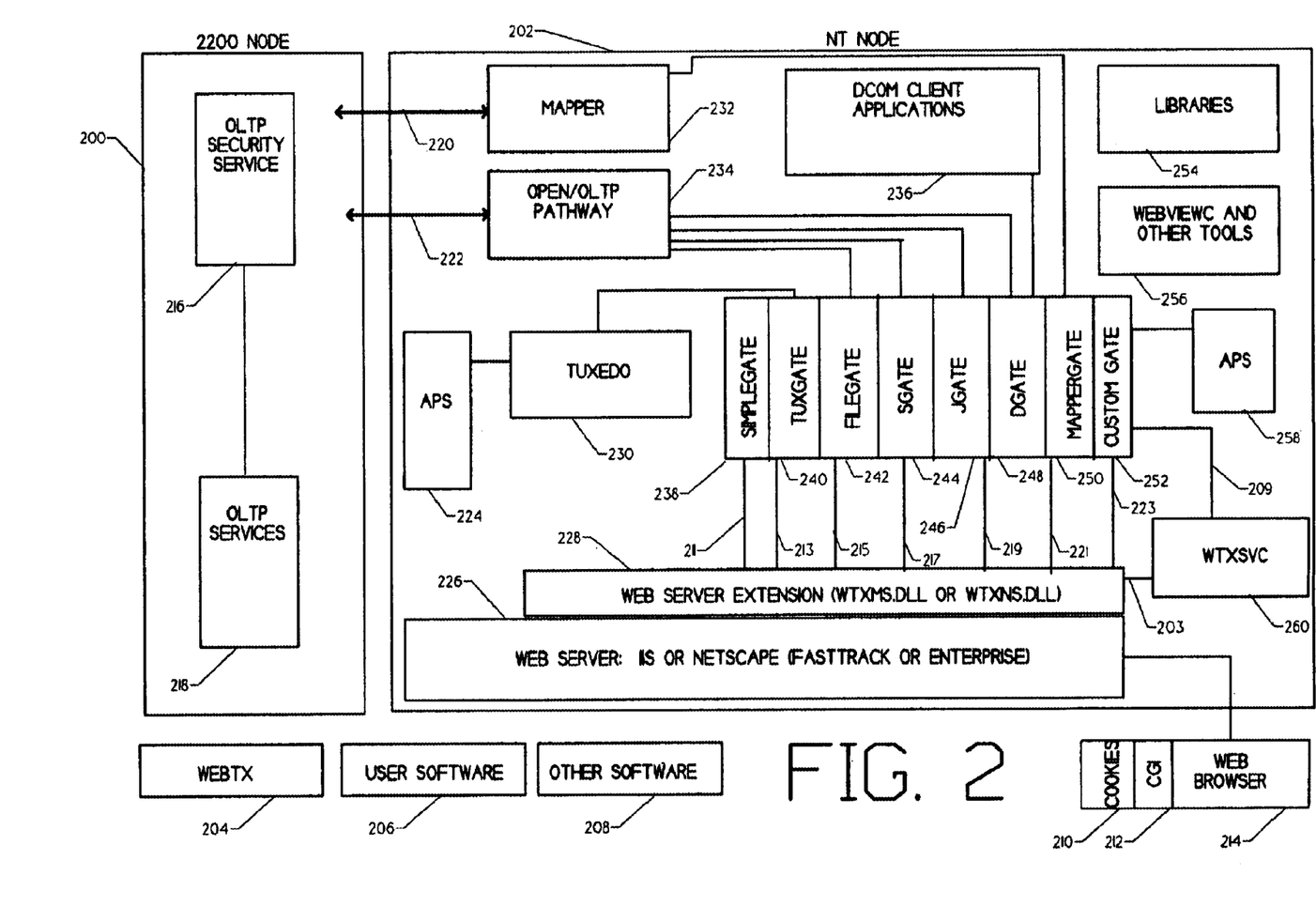
FIG. 2 is a functional block diagram of the computing environment in which the present invention resides.

FIG. 2 is a functional block diagram of the computing environment in which the present invention resides. In general, WebTx is middleware in a client/server computing environment which accepts requests from the client side and routes the requests to the correct place on the server side, then passes a response from the server side back to the client side. In the context of the present invention, WebTx "marries" a web browser 214 with a transactional client/server architecture (such as the Unisys 2200 enterprise node, as shown at 200).

The WebTx environment, as utilized in the present invention, is comprised of several components, including a web server 226, Web Server Extension (WTXMS.DLL or WTXNS.DLL) 228, a Monitor (WTXSVC) 260, one or more Gateways 238, 240, 242, 244, 246, 248, 250, 252, the WebViewC compiler 256, a set of libraries 254, and other special purpose tools 220.

The WebTx Monitor 260 communicates with the Web Server Extension 228 via interface 203, and a Gateway 238, 240, 242, 244, 246, 248, 250, or 252 via interface 209. The Monitor 260 functions as the WebTx administrative tool. One function of the Monitor 260 is to start and stop the gateways 238, 240, 242, 244, 246, 248, 250, and 252, as needed. Within a Unix environment, the WebTx monitor module is known as WebMon (not shown), while under the Windows NT environment, the WebTx monitor module is known as WtxSvc 260.

The WebTx Web Server Extension component 228, is a run-time extension of the web server 226 (such as Netscape FastTrack, Netscape Enterprise, or Microsoft IIS). The function of the Web Server Extension 228 is to intercept requests intended for WebTx 204, and instead route the requests to the Gateways 238, 240, 242, 244, 246, 248, 250, or 252. The Web Server Extension 228 will also interpret the response from the Gateways 238, 240, 242, 244, 246, 248, 250, or 252, and route the reply. The Web Server Extension 228 is connected to the Gateways 238, 240, 242, 244, 246, 248, 250, or 252 via interfaces 211, 213, 215, 217, 219, 221, and 223. The Web Server Extension 228 is connected to the Monitor 260 via interface 203.

The Gateways 238, 240, 242, 244, 246, 248, 250, and 252 perform tasks which are grouped into conceptual areas. The Gateways 238, 240, 242, 244, 246, 248, 250 and 252 receive requests from the Web Server Extension 228 or from the Applications 258 and take whatever action is necessary to fulfill the request. This typically involves transforming a request (such as a URL from a web browser or remote procedure calls (RPCs) from a DCOM client) into a format which is understandable by a Distributed Transaction Processing System such as a Unisys 2200 Enterprise System 200. The Gateways 238, 240, 242, 244, 246, 248, 250, and 252 also transform data returned from the Distributed Transaction Processing System 200 into a formatted response which is returned to the requester.

The SimpleGate Gateway 238 is specifically utilized as a test tool. It merely echoes a request. The TUXGate Gateway 240 provides generalized access to OLTP services through BEA TUXEDO 230. BEA TUXEDO 230 acts as the hub for a distributed enterprise and Internet 3-tier applications. It provides an open environment that supports a wide variety of clients, databases, networks, legacy systems, and communications options. The FileGate Gateway 242 works in conjunction with a specific OLTP service to access textual files on the Unisys 2200 node. ViewGate (not shown) provides generalized access to OLTP services on the Unisys 2200 note (specifically HTML output). JGate 246 provides generalized Java applet access to OLTP services on the Unisys 2200 node. The DGate Gateway 248 provides generalized DCOM access to OLTP services on the Unisys 2200 node. The MapperGate Gateway 250 provides generalized access to Mapper applications within the Microsoft Windows NT environment. A Custom Gateway, such as shown at 252, provide a way for a customer to build their own Gateway to interface their own applications to an OLTP enterprise application.

Finally, the security gateway (SGate) 244, one of the objects of this invention, receives Cookie information 210 and CGI variables 212 from a web browser 214 via the WebTx Web Server 226 and WebTx Web Server Extension 228. The security gateway (SGate) 244 then builds a view file using the user identification information, CGI variables 212, the end service name and Cookies 210, then calls a security service 216 executing on the OLTP server 200, passes the view file to the security service 216, and waits for validation of the request. The security gateway (SGate) 244 will eventually receive a response from the OLTP security service 216 indicating whether the request was validated by the OLTP server. If the request was validated, the security gateway (SGate) 244 will allow the request to be processed. That is, the security gateway 244 will build a view buffer associated with the requested OLTP end service 218, and will then pass the buffer to the OLTP server. If the request is not validated, further access to the OLTP service 218 is denied.

The WebViewC compiler 256 is used in conjunction with specific Gateway implementations, such as ViewGate, TUXGate, and JGate. The WebViewC compiler 256 compiles Open/OLTP view files generated on the OLTP enterprise system to create WebTx view files (.wv) and HTML files (.html). The WebViewC compiler is a free-standing component with no direct communication to any of the other components within the WebTx environment.

Other WebTx Components include libraries 254 such as the Software Development Kit (SDK) libraries, which provide framework and functions for building Custom Gateways. The SDK is specifically designed to allow customers to build their own gateways. Another type of library present within the WebTx system are Java Class Libraries, which provide class definitions for building JGate compatible applets.

Figure 3:
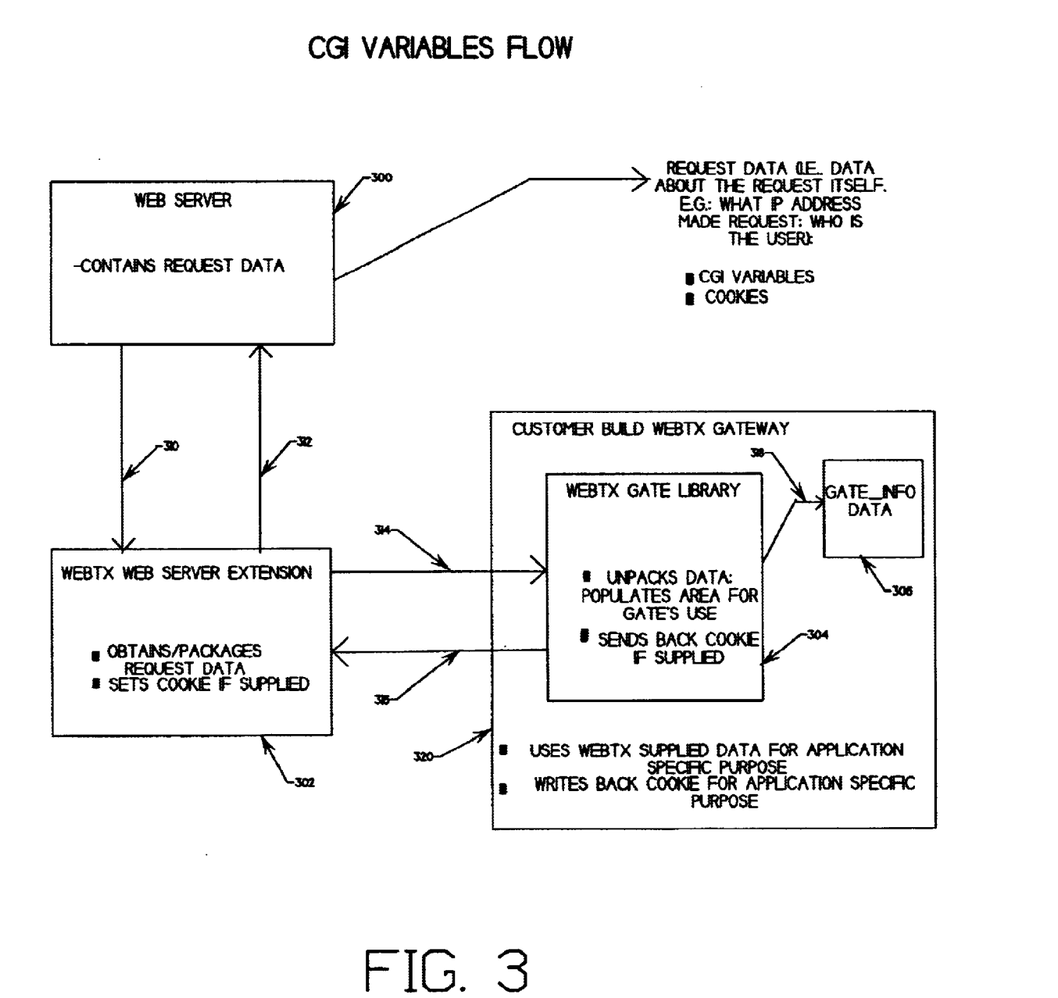
FIG. 3 is a block diagram showing the flow of CGI variables through the components of the computing environment.

FIG. 3 is a block diagram showing the flow of CGI variables through the components of the computing environment. The web server 300 contains request data from a web browser (i.e. data about the request itself). Examples of request data information include: what IP address made the request and who is the user. This request data is in the form of CGI Variables and Cookies, further described in the detailed description of FIG. 1, as shown above.

The web server 300 will package and forward the request data (CGI Variables and Cookies) to the WebTx Web Server Extension 302 via interface 310. The WebTx Dynamic Link Library (DLL), a component of the WebTx Web Server Extension 302, obtains the request data from the web server 300 (Microsoft IIS or Netscape Enterprise/Fastrack servers), re-packages the request data, then passes the re-packaged data to the specified WebTx gateway 320 via interface 314.

In order to collect data from the web server 300, the WebTx Dynamic Link Library (DLL) 302 makes calls to the web server 300 via Internet Server Application Program Interface (ISAPI) calls. The WebTx DLL 302 collects as much of the data as possible to populate the Gateway Data Structure, further described in FIG. 6. Some of the entries in the Gateway Structure may be web server specific. This information includes standard CGI variables, Cookies, Post/Get data and additional security relevant data. This data is then formatted in buffers and the buffers are then sent to the Gateways 320 (via pipes (Windows NT) or shared memory segments (UnixWare)). In the case of Windows NT, there are three writes to the security gateway 320. One write sends the packaged data variables, another write sends the Cookie information and the final write sends the POSTed data, if such data exists. This step is common for all web based gateways.

Each gateway 320 is built by linking the gate.lib library 304 into it and including the gate.h include file (not shown). The gate.h include file is where the Gateway Data Structure GateInfo (further described in FIG. 6) is defined. The WebTx gate.lib library 304 is a unique library in that it actually contains the main procedure for the gateway 320. This configuration allows WebTx to control a great deal of what is done by the various gateways (Setup, Process, and Cleanup). Part of the setup done by the WebTx gate library code.(gate.lib) 304 is to process the buffers that were sent to the gateway from the WebTx Web Server Extension DLL 302. Basically, the GateInfo data structure 306 (as described in FIG. 6) is set up and sent by this processing, via interface 318. Also, within the WebTx Gateway 320, routines are called to load the views that are associated with the service being called.

For the SGate gateway 320, there are two views loaded at this time. The first view loaded is the security service view (secsvc_view). This view is populated with data from the GateInfo data Structure 306 as well as being processed by the Templete.c code. The Templete.c code is the standard routine for loading a view. The second view loaded is whatever view specific information the user decides to use with the Open OLTP end service. This second view information is loaded via the Templete.c code.

The SGate gateway 320 first sends the security service view (secsvc_view) information to the OPEN/OLTP security end service. If the user is authenticated by the security end service, the SGate gateway 320 then sends the end user view data. After the SGate gateway 320 passes the view data to the enterprise OLTP end service, the gateway 320 will await a reply from the Open OLTP end service that the requested task has been successfully completed. After a reply is received by the WebTx Gateway 320, the Gateway 320 returns Cookie and Open OLTP end service output information back to the WebTx Web Server Extension 302 via interface 316. The WebTx WebServer Extension 302 then sets the Cookie information, if supplied by the end service, and returns the Cookie and Open OLTP end service output information back to the web server 300, so that the information can be returned to the requesting browser.

Figure 4:
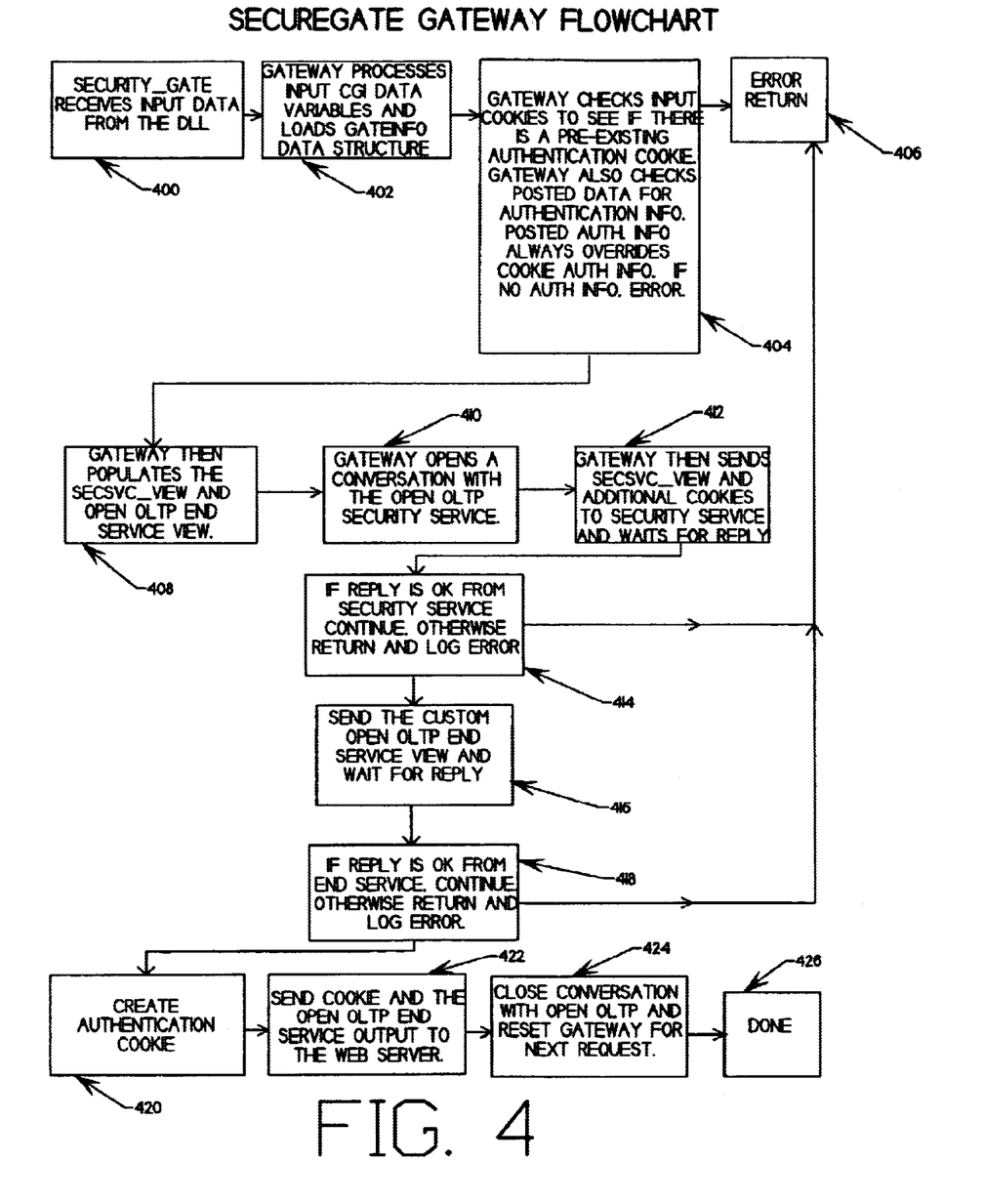
FIG. 4 is a flowchart illustrating a step-by-step process flow through the SGate transaction gateway.

FIG. 4 is a flowchart illustrating a step-by-step process flow through the SGate transaction gateway. The SGate gateway is designed to call an enterprise-based OLTP security service to authenticate a user request then pass the request through to another OLTP service (otherwise known as the OLTP end service).

In step 400, the SGate gateway receives input data from the WebTx Web Server Extension Dynamic Link Library (DLL). In step 402, the SGate gateway processes the input CGI data variables and loads the GateInfo Data structure, both of which were passed to the gateway from the WebTx Web Server Extension.

Next, in step 404, the SGate gateway checks any input cookies to see if there is a pre-existing authentication cookie. The SGate gateway also checks POSTed data for authentication information. POSTed authentication information always overrides Cookie authorization information. If there is no authentication information passed through either the Cookies or POSTed data, an error message is issued at step 406.

Otherwise, if authentication information is present, processing proceeds to step 408, where the SGate gateway then populates the security service view (secsvc_view) and custom Open OLTP end service view. Next, at step 410, the SGate gateway opens a conversation with the enterprise-based Open OLTP Security Service.

At step 412, the SGate gateway then sends the secvc_view and additional Cookies to the OLTP Security service and waits for a reply from the security service. In step 414, if an unsuccessful reply is received by the security gateway from the Security Service, an error message is issued at step 406, and processing is terminated. However, if a successful reply is received from the security service, processing continues at step 416, where the custom Open OLTP end service view is sent to the enterprise based OLTP end service. The security gateway then waits for a reply from the OLTP end service.

At step 418, if a unsuccessful reply is received from the Open OLTP end service, an error message is issued at step 406 and processing is terminated. Otherwise, an authentication cookie is created at step 420.

Next, at step 422, the authentication cookie and the Open OLTP end service output is sent back to the web server so that the information can be sent to the requesting browser. At step 424, the conversation is closed with Open OLTP and the SGate gateway is reset for the next request. Finally, at step 426, processing is completed.

Figure 5:
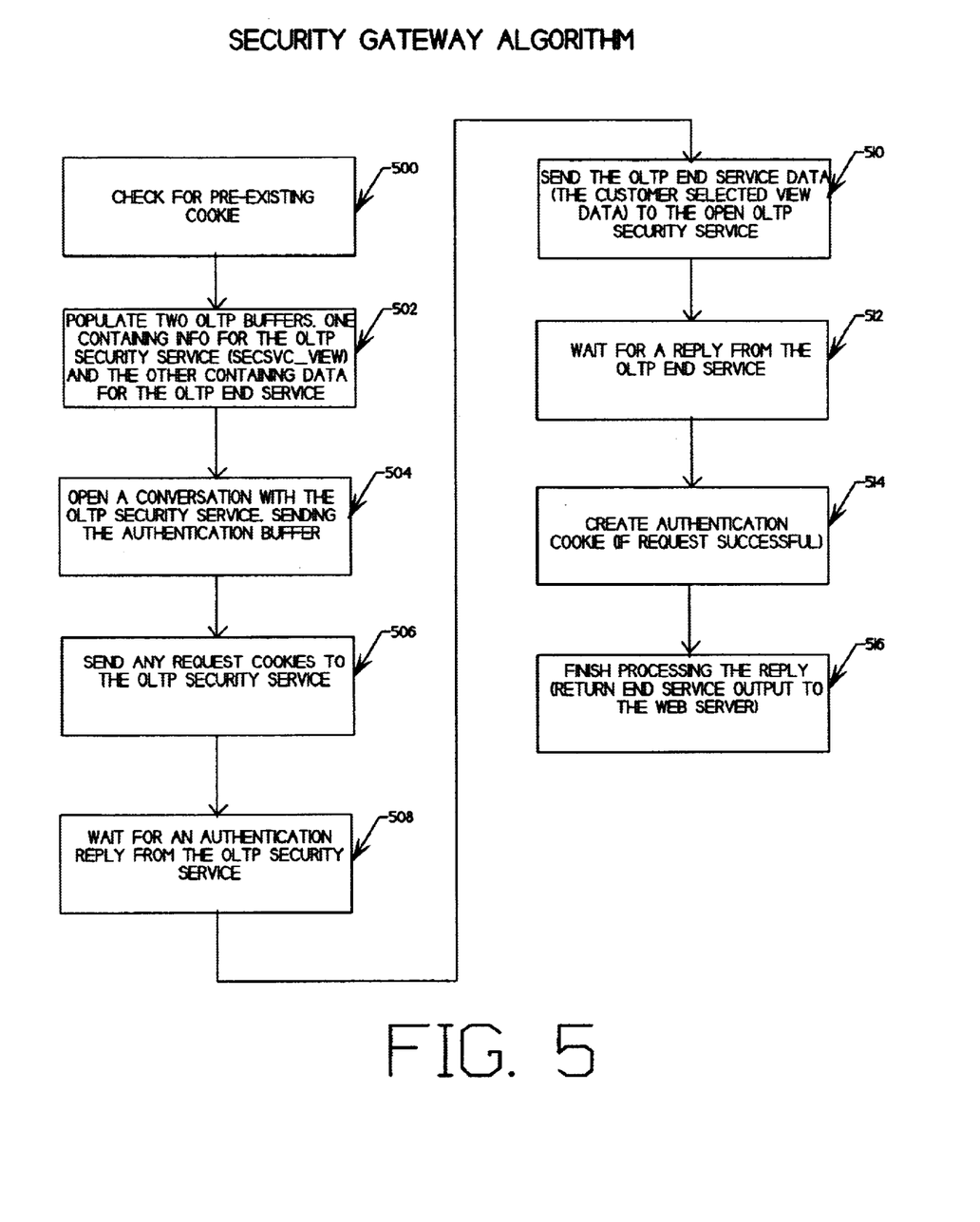
FIG. 5 is a flowchart illustrating the computer algorithm utilized by the SGate transaction gateway program.

FIG. 5 is a flowchart illustrating the computer algorithm utilized by the SGate transaction gateway program. The SGate gateway is designed to call an enterprise-based OLTP Security Service to authenticate a user request, then pass the request through to another OLTP service (also referred to as the OLTP end service). The first step in the SGate algorithm is to check for pre-existing authentication cookies, as shown at step 500. When a user issues a secure transaction request, three types of data are passed to SGate: 1) request input data, 2) request environment variables and 3) request cookies. These three types of data are sent to SGate. More specifically, the following data is sent to SGate: 1) an authentication buffer containing authentication information and request environment variables and the name of the OLTP end service, 2) request cookies (one at a time) and 3) OLTP end service data formatted from the request input data.

Once a user has been authenticated, SGate will write authentication information to a Cookie that is used on subsequent requests to save the user the hassle of repeatedly inputting authentication information.

After the algorithm has checked for pre-existing Cookies, the algorithm next populates two OLTP view buffers, one containing information for the OLTP Security Service (secsvc_view) and the other containing data for the requested OLTP end service, as shown in step 502.

The algorithm next opens a conversation with the OLTP Security Service, sending the authentication buffer, as shown in step 504. In step 506, the algorithm then sends any request cookies to the OLTP security service.

After performing steps 504 and 506, the algorithm goes into an idle state, waiting for an authentication reply from the OLTP Security Service, as shown at step 508. After an authentication has been successfully received by SGate, the algorithm then sends the OLTP end service data (this is the customer selected view data) to the Open OLTP Security Service, as shown at step 510.

Once again, SGate goes into an idle state; waiting for a reply from the OLTP end service, as shown at step 512. Once a reply is received from the OLTP end service, SGate next creates an authentication cookie (if the request is successful), as shown at step 514. Finally, SGate will finish processing the reply received from the OLTP end service, and return the end service output to the web server, as shown in step 516.

Figure 6:
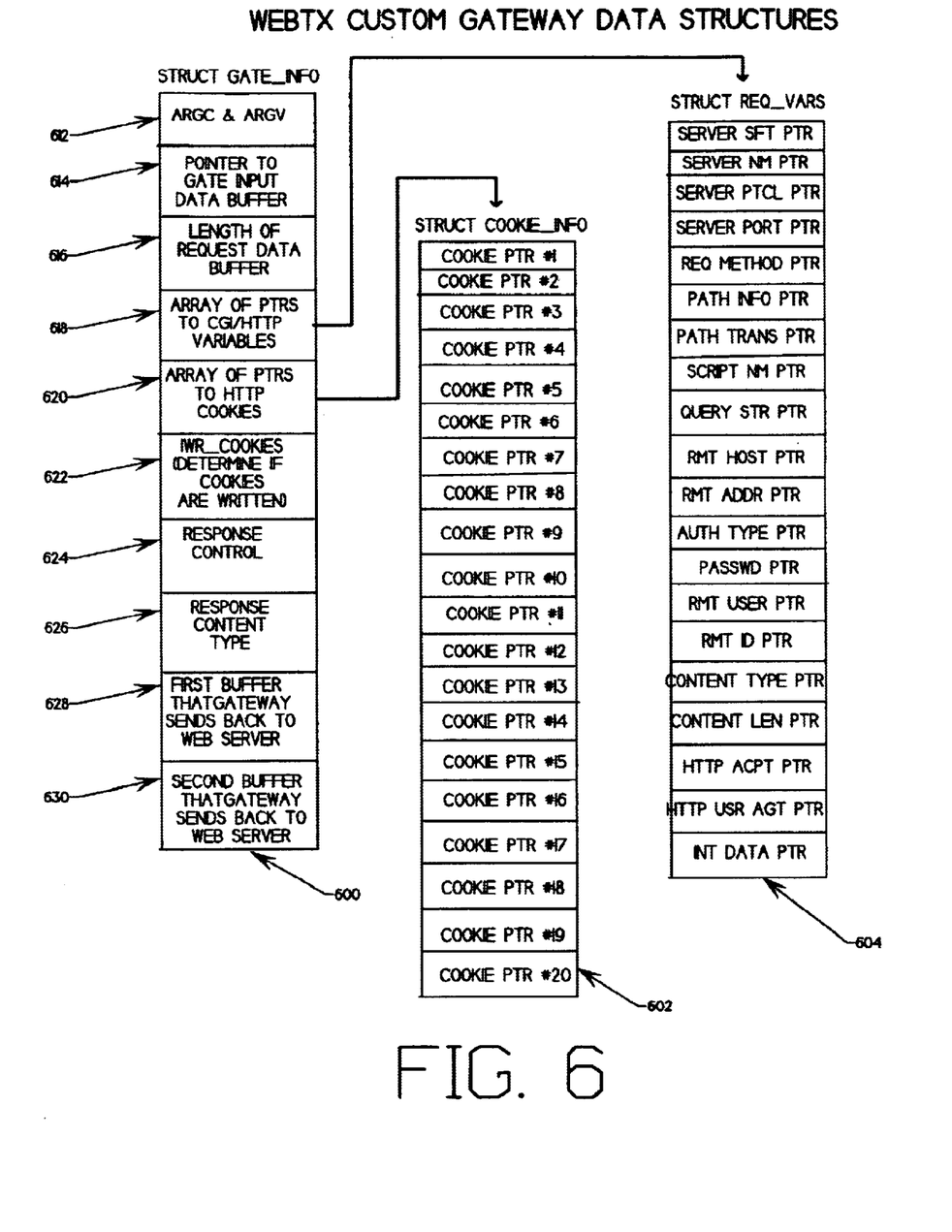
FIG. 6 is an illustration of the data structures utilized by the WebTx custom gateway.

FIG. 6 is an illustration of the data structures utilized by the WebTx custom gateway. There are three primary data structures that will be visible within a gateway developed for WebTx: GateInfo 600, Reqvars 604, and CookieInfo 602.

The main data structure is GateInfo 600. The GateInfo structure contains an integer called argc and an array of pointers called argv, as shown at 612. Argc is the number of arguments passed to the gateway at execution time. Argv is an array of pointers to the arguments passed to the gateway.

The GateInfo structure 600 also contains a pointer (pGate_in_data) to the gate input data buffer, also known as the request data, as shown at 614. This pointer will be the POSTed data if the method from the HTML form was POST. WebTx does not do anything with this data, it is passed straight through to the gateway. GateInfo 600 also has an element which contains the number of bytes of data in the buffer pointed to by pGate_in_data, as shown at 616.

The GateInfo structure 600 also contains an element 618 which is a structure of pointers to CGI/HTTP request variables called ReqVars 604, which is the second major part of the informational data structure. ReqVars 604 is described in more detail below.

GateInfo 600 also contains a an element 620 which is structure of pointers to HTTP Cookies called CookieInfo 602, which is the third and final part of the informational data structure. The CookieInfo structure 602 contains pointers to a defined number of possible cookies used for both input and output. CookieInfo 602 is described in more detail below.

The GateInfo structure 600 contains an integer variable called iWr_Cookies, shown at 622, which if set to a non-zero value by the gate, on output, the Web Server Extension DLL sends the Cookie information to the client browser of the current session. The Cookie information that is written comes from the CookieInfo structure 602, further described below. If Cookie information is to be written, the iWr_Cookies flag must be set prior to the first transmit.

GateInfo 600 also contains an integer variable called response control (Resp_Control), as shown at 624, which contains a value to indicate how to process the response. A value of "0" indicates "send a response". This is the "normal" case where, for example, HTML is to be sent to the web browser. A value of "1" indicates that the gate requests authentication. A value of "2" indicates that even though control was passed to the gate, the gate wants to indicate to the web server that it really did not perform any processing and that the request should be passed through to the next service. This is only applicable to the Netscape family of web servers. When a value of 1 or 2 is used, any data that may have been setup by the gate is ignored (i.e., not sent to the browser).

The GateInfo Structure 600 also contains an ASCII text field called Resp_ContentType, shown at 626, which is the content type for the response. For example, this field may contain the string value "text/html". This field is required and must be set prior to the first transmit.

Finally, the GateInfo Structure 600 contains two pointers (pTmp_user1 and pTmp_user2), shown at 628 and 630 respectively. These pointers 628 and 630 are set aside for the custom gateway developer. Pointers 628 and 630 may be used to point to the data buffers that the gateway sends back to the web server via the transmit procedure. It is up to the gateway to do any memory allocation/deallocation for the buffers which are pointed to by these pointers.

The ReqVars structure 604 contains pointers which point to the standard CGI data variables provided by the web server. If no data was provided by the web server for a particular variable, its pointer will be null. There is no attempt here to describe the actual contents of each variable due to the fact that the contents may vary slightly by web server. All of the data pointed to by these pointers should be treated as read only. WebTx will not look at these pointers or their data on the return to the WebTx Web Server Extension DLL.

The CookieInfo Structure 602 contains pointers which point to the maximum number of Cookies received by the server from the client browser. Upon entry to the gateway, this structure will contain any Cookies sent from the client's web browser, if any. There is no guarantee that these are the specific Cookies that the gateway may be looking for. If the iWr_Cookies variable 622 is non-zero when the first Transmit function is called, WebTx sends one Cookie to the client browser for the current session. Thus, the server will accept up to 20 Cookies from the browser, but only one Cookie is sent back to the browser from the gateway/server, if the "write cookie" flag (iWr_Cookies) is set.

There is no guarantee that the client browser will accept the Cookie information. This means on input to the gate, Cookies that are expected may or may not be present. The custom gateway developer should be aware of this, and may have to code for this possibility.

For each cookie pointer which is non-null, a Cookie will be written. The data pointed to by the Cookie pointer should have the following format:

"NAME=VALUE; expires=DATE; path=PATH; domain=DOMAIN_NAME; secure"

As an illustrative example:

"PRODUCT=WebTx; path=/foo; expires=Tuesday, 25 May 98 23:00:00 GMT"

FIG. 7 illustrates a functional, block-level overview of the enterprise-based On-Line Transaction Processing (OLTP) System security service of the present invention. In broadest terms, WebTx Software 710 and 714 (available from Unisys Corporation) provides a security gateway to act as an On Line Transaction Processing (OLTP) client that packages input from a Web page (coded in HTML) and establishes a conversational connection with an OLTP security service 720. In conversational communication, client programs establish logical connections with service routines and conduct dialogues. Dialogues occur as one program sends data and the other receives data. During conversations, clients and service routines can exchange the sending and receiving roles.

The OLTP security service 720 authenticates the caller and calls the requested OLTP end service 722. The security service 720 is a Unisys provided code module in the form of a template. It is intended that a customer can modify the service to suit their particular needs. The WebTx security gateway 714 can operate in a Windows NT or UnixWare environment 702, using HTP/IC or Pathway 716 to communicate with OLTP software 718.

To begin the process, a Personal Computer 700 based web browser 760 presents an HTML page that requests the following minimally required information from the user: user-id, password, and OLTP end service information. The HTML page can be customized to embed or request other security information elements, such as a new password, account number, project-id, clearance level, and compartment set.

When the HTML page is submitted by the user, the web server program 708 passes the following information to the WebTx Server Extension DLLs 710, and ultimately, the WebTx gateway 714: user-id, password, OLTP end service information, OLTP security service request, OLTP end service name to call, end service input/output buffer types, and browser CGI variables.

The WebTx security gateway 714 acts like an OLTP client and packages the following information in an internally defined input buffer (secvc_view): security information, CGI variables, and the OLTP end service name 722 to be called. The buffer is used on a send-only conversational connection to the OLTP security service 720. The WebTx security gateway client 714 passes any Cookies associated with the Internet user, one at a time, to the security service 720. A maximum of 20 Cookies may be passed in this manner. After the final Cookie is sent, the gateway 714 passes control of the conversation to the security service 720. The WebTx security gateway 714 then waits for an authentication response from the security service 720.

When the security service 720 is called from the WebTx security gateway 714, the service calls the OS 2200 Open/OLTP Transaction Manager (OLTP-TM2200) subsystem to enqueue the authentication request based on the security information provided. OLTP-TM2200 is the Unisys Corporation implementation of an X/Open compliant transaction manager (TM) for the OS 2200 operating environment of ClearPath HMP IX Series with UNIX servers and OS 2200 Series systems. The security service 720 waits until the Open CMS (OCMS) activity processes the request using the SESSION$CTRL interface.

By way of definition, the SESSION$CTRL interface can authenticate the following security information: user-id, password, new password, account, project, clearance level, and compartment set. Authenticate means to pass the OS 2200 sign on requirements for the security level of the accessed system. Using the SESSION$CTRL interface to authenticate security information creates an open Transaction Processing (TIP) session. This session is immediately terminated and not utilized by Open/OLTP software. The interface is called only to verify that the user can pass the operating system sign-on checks. It means, however, that the user-ids of all callers must have access to the TIP environment.

The Open CMS (OCMS) activity is an OLTP-TM2200 real time activity that is started as a task under the transaction management system control (TMSC) run. This activity dequeues authentication requests placed on the subsystem request queue by a security server and calls the SESSION$CTRL interface to process the request. To call the interface, OCMS must register as an open CMS type and establish a routing output queue (ROQ) and a position identifier (PID) pool based on configuration information. The results for a processed authentication request are placed on the ROQ by the operating system. When authentication results are available, the OCMS activity removes the result from the ROQ and delivers the reply to the waiting security server.

If the authentication request is successful, the security service sends a successful condition to the waiting WebTx security gateway client 714, obtains the end service input buffer from the gateway client, calls the end service 722, and returns the end service results to the WebTx security gateway client. If the authentication request is unsuccessful, the security service 720 returns a failure condition to the WebTx security gateway 714 and provides a message buffer indicating the error.

Back at the waiting security gateway 714, if the security service 720 authentication request is returned as successful, the gateway 714 allocates an end service input buffer based on the previous HTML information, fills in the user supplied data, sends the end service input buffer to the security service, obtains results upon completion of the end service transaction 722, and forwards the end service results to the web browser 706.

If the security service 720 authentication request is returned as unsuccessful to the waiting security gateway 714, the security service 720 returns a failure condition and provides a message buffer indicating the error.

Figure 8:
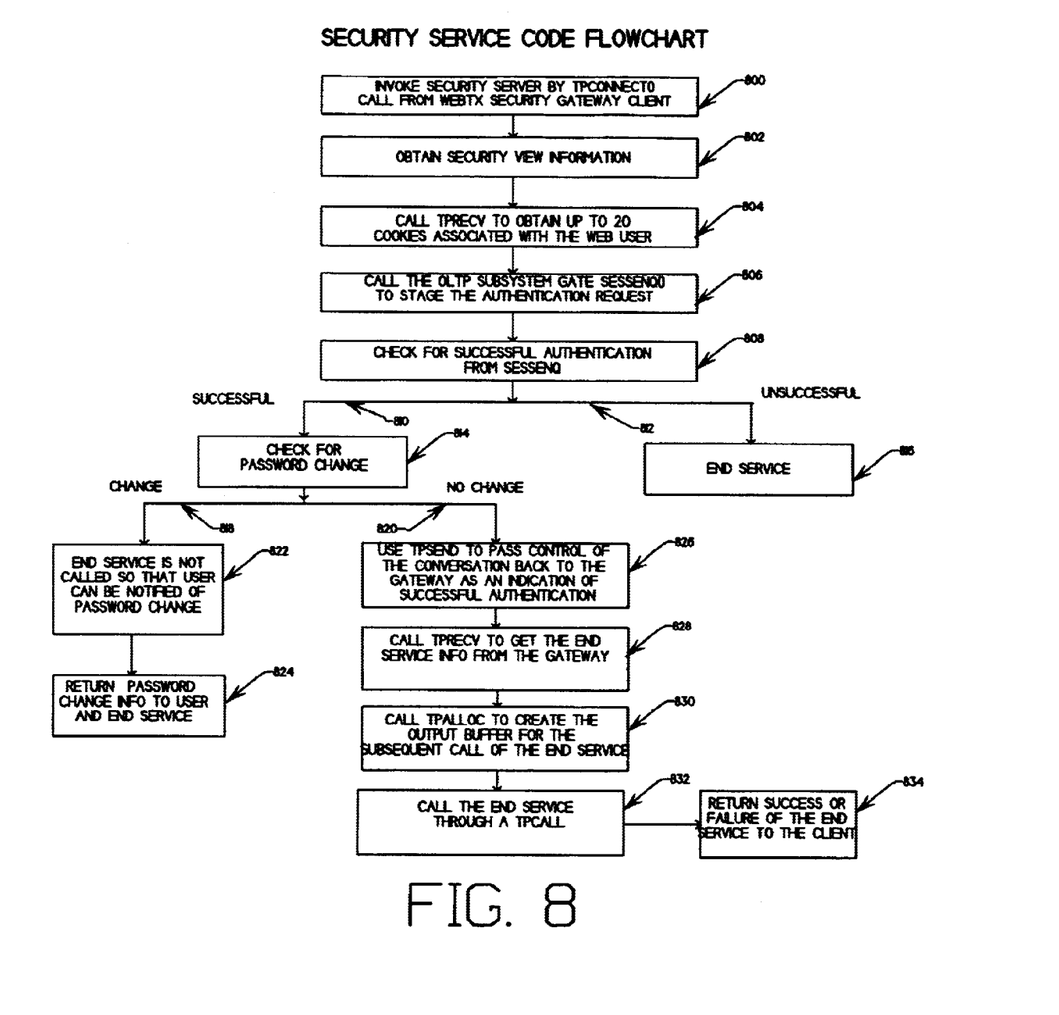
FIG. 8 is a flowchart illustrating the enterprise-based On-Line Transaction Processing (OLTP) System security service program code.

FIG. 8 is a flowchart illustrating the enterprise-based On-Line Transaction Processing (OLTP) System security service template module. The security service template module can be built into an OLTP batch, Transaction Processing (TIP), or High-Volume Transaction Processing (HVTIP) server to request authentication of user security information which minimally consists of a user-id and a password. The security server will be invoked by a tpconnect( ) call (to establish a conversational service connection) from the WebTx security gateway client, as shown in step 800.

After the security service view information is obtained by the security service through the security gateway tpconnect( ) call 802, the security service will loop on the tprecv( ) call (receives a conversational message) to obtain up to 20 Cookies associated with the web user, as shown in step 804. The Cookie buffers are sent in as X_OCTET strings and can be recorded or used as needed. The X_OCTET type buffer is an array of bytes (characters). The contents of an X_OCTET typed buffer are completely defined by the application. This typed buffer is used for application programs that internally define the structure of the data to be exchanged.

After the Cookies associated with the web user have been obtained, the security service code then calls the OLTP subsystem SESSENQ( ) gate or function to stage the authentication request, as shown in step 806. The authentication is performed by the operating system SESSION$CTRL interface. The OLTP open cms activity, ocms, services the authentication request by dequeuing it from the subsystem queue and calling the interface on behalf of the server. Authentication information is provided via the authinfo structure. The server will wait until the authentication request is complete.

Next, at step 808, a check is made by the security service for successful authentication from SESSENQ. If the request was successful 810, check for a password change 814. If a password change was made 818, the end service is not called 820 so that the user can be notified of the password change 822. The password change information is returned, and the service is stopped 824.

If the authentication was successful, and there was no password change 820, control of the conversation is sent back to the gateway as an indication of successful authentication, as shown at 826. Next, the information that is to be passed to end service needs to be retrieved from the gateway 828. To do this, the function tprecv( ) is sent to the gateway using a dummy buffer. This dummy buffer will be reallocated within the call to the actual type of buffer needed by the end service. This automatic reallocation allows the security service to be used as generic front end to any end service which requires authentication.

Next, the security service code does a tpalloc( ) of the output buffer for the tpcall( ) (sends a service request and waits for the reply), as shown in step 830. This buffer is also a dummy buffer which is automatically reallocated with the tpcall( ). This automatic reallocation allows the security service to be used as a generic front end to any end service which requires authentication.

Next, the end service is called through a tpcall( ). Finally, at step 834, the security service code returns a success or failure of the end service flag, along with end service information to the client.

If the authentication from SESSENQ was unsuccessful 812, the service is ended 816.

Having thus described the preferred embodiments of the present invention, those of skill in the art will readily appreciate that the teachings found herein may be applied to yet other embodiments within the scope of the claims hereto attached.

We claim:

1. In a data processing system, the improvement comprising:
    at least one web browser interconnected to at least one The enterprise-based On-Line Transaction Processing (OLTP) System via a transaction gateway;
    means for exchanging Cookie information and CGI variables between said web browser and said enterprise-based On-Line Transaction Processing (OLTP) System;
    wherein upon a web request a web server formats said CGI variables and said Cookie information from said request into a requesting long string which is passed to a middleware Web Server Extension; and
    wherein said middleware Web Server Extension understands the format of said requesting long string, and re-packages variables from said requesting long string into a requesting array which is passed to the transaction gateway associated with said request.

2. A data processing system; according to claim 1 wherein said transaction gateway builds a input view file using the Cookie and CGI variables from said requesting array, then passes said input view file to an On-Line Transaction Processing (OLTP) service application.

3. A data processing system according to claim 2 wherein said On-Line Transaction Processing (OLTP) service application returns an output view file to said transaction gateway upon completion of said request.

4. A data processing system according to claim 3 wherein said transaction gateway unpacks said output view file returned from said gateway, populates a web page with information from said output view file, and builds a return Cookie wherein said web page and return Cookie are passed back to said middleware Web Server Extension.

5. A data processing system according to claim 4 wherein said middleware Web Server Extension passes back said web page and said return Cookie to said web server.

6. A data processing system according to claim 5 wherein said web server passes said return Cookie and said web page back to said web browser.

7. A data processing system according to claim 1 wherein said interconnection is the Internet.

8. A data processing system according to claim 1 wherein said enterprise On-Line Transaction Processing (OLTP) system is a commercial mainframe computer.

9. A data processing system according to claim 1 wherein said transaction gateway is an interface which allows Java applets running in a web browser to make program calls to an OLTP-style application running on said enterprise OLTP system.

10. A data processing system according to claim 1 wherein said transaction gateway is an interface which allows a web browser running in a Distributed Component Object Module (DCOM) environment to make program calls to an OLTP-style application running on said enterprise OLTP system.

11. A data processing system according to claim 1 wherein said transaction gateway is a security gateway which passes said Cookie information and CGI variables to a security service executing on said enterprise OLTP system.

12. A data processing system according to claim 1 wherein up to 300 said Cookies can be stored at a client at one time, with a 4 kilobyte limit per said Cookie, and a limit of 20 said Cookies per server and domain.

13. In a data processing system having at least one web browser interconnected to at least one Enterprise-Based On-Line Transaction Processing (OLTP) System, the improvement comprising:
    a security gateway component which manages communications between said web browser and said Enterprise-Based On-Line Transaction Processing (OLTP) System;
    wherein upon issuance of a web request, said web browser passes Cookie information and CGI variables to said security gateway;
    wherein said Cookie information and CGI variables are packaged by said security gateway into an input view file; and
    wherein an authentication request is passed from said security gateway to a security service residing on said enterprise-based On-Line Transaction Processing (OLTP) System.

14. A data processing system according to claim 13 wherein upon successful validation of said authentication request by said enterprise-based OLTP security service, a response will be passed from said security service to said security gateway authorizing said request.

15. A data processing system according to claim 14, wherein upon receiving said request authorization from said security service, said security gateway builds a view buffer associated with a OLTP service application requested, and passes said view buffer to said OLTP service application.

16. A data processing system according to claim 14, wherein if no request authorization is received by said security gateway from said security service for said request, access to a OLTP service application is denied.

17. A data processing system according to claim 13, wherein said security gateway runs on a commercial web server machine.

18. In a data processing system having at least one web browser interconnected with at least one Enterprise-Based On-Line Transaction Processing (OLTP) System, the improvement comprising:

a security service component residing on said OLTP System which validates a request from said web browser;

wherein said security service is a C code module written in the form of a standard OLTP-TM2200 service; and wherein upon receipt of a an authentication request from said WebTx security gateway client, said security service calls the standard OLTP-TM2200 service subsystem to enqueue said authentication request based on the security information provided.

19. A data processing system according to claim 18 wherein said enqueued authentication request is dequeued by an Open CMS (OCMS) activity which calls a session control interface to process the request.

20. A data processing system according to claim 19 wherein said session control interface can authenticate user-id, password, new password, account, project, clearance level and compartment set security information.

21. A data processing system according to claim 20 wherein results from said authentication requests are placed on a routing output queue (ROQ) by the operating system, such that said OCMS activity removes said results from said ROQ and delivers said results to said security server.

22. A data processing system according to claim 21 wherein if said authentication request is successful, said security service sends a successful condition to said security gateway client, calls a function to obtain an end service input buffer from said middleware security gateway, calls an end service application passing said end service input buffer, and returns results from said end server to said security gateway client.

23. A data processing system according to claim 21 wherein if said authentication request is unsuccessful, said security service returns a failure condition to said security gateway client, and provides a message buffer explaining said failure.

24. In a data processing system having at least one web browser interconnected to at least one Enterprise-Based On-Line Transaction Processing (OLTP) System, the improvement comprising:

a security service component residing on said OLTP System which validates all requests from said web browser;

a security gateway component which manages communications between said web browser and said Enterprise-Based On-Line Transaction Processing (OLTP) System; and means for passing information between said web browser and said Enterprise-Based security service component via said security gateway component, wherein said information comprises Cookies and CGI Variables.

25. A data processing system according to claim 24 wherein said web browser passes a user-id, OLTP end service information, an OLTP security service request, an OLTP end service name to call, end service input/output buffer types, and said Cookies and CGI Variables to said security gateway component, via a web server.

26. A data processing system according to claim 25 wherein said security gateway component packages a set of security information, said Cookies and CGI Variables and said OLTP end service name into an internally defined input buffer which is passed to said security service component.

27. A data processing system according to claim 26 wherein said security gateway passes said Cookies, one at a time to said security service component, up to a maximum of 20 said Cookies.

28. A data processing system: according to claim 27 wherein upon receipt of an authentication request from said security gateway, said security service calls an OLTP Transaction Manger 2200 subsystem to enqueue said authentication request based on the security information provided.

29. A data processing system according to claim 28 wherein said enqueued authentication request is dequeued by an Open CMS (OCMS) activity which calls a session control interface to process the request.

30. A data processing system according to claim 29 wherein said session control interface can authenticate user-id, password, new password, account, project, clearance level and compartment set security information.

31. A data processing system according to claim 30 wherein results from said authentication requests are placed on a routing output queue (ROQ) by the operating system, such that said OCMS activity removes said results from said ROQ and delivers said results to said security service.

32. A data processing system according to claim 31 wherein if said authentication request is successful, said security service sends a successful condition to said security gateway client, calls a function to obtain an end service input buffer from said middleware security gateway, calls an end service application passing said end service input buffer, and returns results from said end service to said security gateway client.

33. A data processing system according to claim 31 wherein if said authentication request is unsuccessful, said security service returns a failure condition to said security gateway client, and provides a message buffer explaining said failure.

34. In a data processing system having at least one web browser and at least one enterprise-based On-Line Transaction Processing (OLTP) System, a method for exchanging information between said web browser and said enterprise-based On-Line Transaction Processing (OLTP) system wherein said web browser and said enterprise-based OLTP system are interconnected by a workstation based security gateway, comprising the steps of:

receiving an OLTP transaction request and associated Cookie and CGI variable information from said web browser via a middleware server;

building a view file using said Cookie and CGI variable information at said security gateway;

calling an enterprise based OLTP security service from said security gateway;

waiting for a validation response from said OLTP security service at said security gateway;

processing said validation response from said security service at said security gateway;

forwarding an end service view file from said security gateway to an enterprise OLTP end service upon successful validation of said request; and returning a set of end service results to said web browser via said security gateway upon processing completion of said enterprise OLTP end service.

35. In a data processing system having at least one web browser interconnected to at least one enterprise-based On-Line Transaction Processing (OLTP) System via a security gateway, a method for validating a transaction between said web browser and said enterprise-based On-Line Transaction Processing (OLTP) system, via an enterprise-based security service, comprising the steps of:

sending an OLTP transaction request and associated Cookie and CGI variable information from said web browser to a workstation based security gateway via a middleware server;

receiving an authentication request and a security view file from a workstation based security gateway at said enterprise based security service;

processing said authentication request by calling a secured operating system interface from said enterprise based security service to authenticate information from said security view file;

returning said authentication information to said workstation based security gateway;

forwarding an end service view file from said security gateway to an enterprise OLTP end service upon successful validation of said request; and returning a set of end service results to said web browser via said security gateway upon processing completion of said enterprise OLTP end service.

* * * * *